(12) United States Patent
Huang

(10) Patent No.: US 6,393,836 B1
(45) Date of Patent: May 28, 2002

(54) TREATMENT DEVICE FOR EXHAUST OF A VEHICLE

(75) Inventor: Ta-Wei Huang, Taipei Hsien (TW)

(73) Assignee: Caien-Feng Huang (TW)

( * ) Notice: Subject to any disclaimer, the term of this patent is extended or adjusted under 35 U.S.C. 154(b) by 0 days.

(21) Appl. No.: 09/769,409

(22) Filed: Jan. 26, 2001

(30) Foreign Application Priority Data

Oct. 26, 2000 (CN) ........................................ 00258067 U

(51) Int. Cl.[7] ................................................ F01N 3/04
(52) U.S. Cl. .............................. 60/310; 96/344; 96/353
(58) Field of Search ...................... 60/310, 297; 95/214, 95/226; 96/337, 344, 353, FOR 140, FOR 145

(56) References Cited

U.S. PATENT DOCUMENTS

| | | | | |
|---|---|---|---|---|
| 2,405,494 A | * | 8/1946 | Dupuy | 60/310 |
| 2,911,289 A | * | 11/1959 | Forry | 96/353 |
| 3,486,307 A | * | 12/1969 | McDermott | 96/353 |
| 3,642,259 A | * | 2/1972 | Bowden | 60/310 |
| 3,648,441 A | * | 3/1972 | Soria et al. | 60/310 |
| 3,695,005 A | * | 10/1972 | Yuzawa | 60/310 |
| 3,735,567 A | * | 5/1973 | Viers | 60/310 |
| 3,815,328 A | * | 6/1974 | Moss | 60/310 |
| 3,984,219 A | * | 10/1976 | Huang | 60/310 |
| 4,924,672 A | * | 5/1990 | Sekiya et al. | 60/310 |
| 5,453,107 A | * | 9/1995 | Liu | 96/344 |

FOREIGN PATENT DOCUMENTS

| | | | | |
|---|---|---|---|---|
| JP | 57-62909 | * | 4/1982 | |
| JP | 5-285331 | * | 11/1993 | 98/FOR 145 |

* cited by examiner

Primary Examiner—Thomas Denion
Assistant Examiner—Tu M. Nguyen
(74) Attorney, Agent, or Firm—Troxell Law Office PLLC

(57) ABSTRACT

A treatment device for exhaust of a vehicle has a main body, a filter net, and a covering lid. The main body includes an exhaust storage chamber and an outer inlet pipe in communication with the exhaust storage chamber for guiding the exhaust from the exhaust pipe of a car into the main body. Branch pipes with radial tubes in the main body communicate with the exhaust storage chamber, each having numerous small apertures. A netting stand is in the main body to support the filter net and liquid agent is filled in the main body with a level below the filter net. The covering lid encloses the upper opening of the main body. The device causes the exhaust to have a greater contact area with the liquid agent and with the filter net. Accordingly, the harmful substances in the exhaust are removed effectively, and the temperature of exhaust and the sound volume of generated noise are lowered substantially.

2 Claims, 4 Drawing Sheets

TREATMENT DEVICE FOR EXHAUST OF A VEHICLE

BACKGROUND OF THE INVENTION

1. Field of the Invention

The present invention relates to a treatment device for exhaust of a vehicle, and particularly to a treatment device, which is to filtrate harmful substances in the exhaust discharged from a vehicle, and to lower down the temperature of exhaust and the sound volume of generated noise simultaneously.

2. Description of Related Art

It is known that the vehicle is an essential and important tool of transportation we need in our daily life. Although the vehicle brings us a great deal of conveniences, unfortunately the exhaust of the vehicle contains harmful substances such as carbon monoxide (CO), carbon hydride (HC), nitrogen oxide (NOx), particle contaminant, and dark smoke. And these harmful substances pollute the air as soon as the exhaust is discharged into the atmosphere. Moreover, it is much more serious in big cities that a great numbers of cars produce a great amount of exhaust all the time to pollute the open air. It is known that the polluted air will hurt the human body and especially the respiratory track and the eyes of the child. Harmful substances spreading along with the exhaust in the air may accumulate without any indication to contaminate plants seriously after a long period of time. Then, the food produced by way of contaminated plants and the meat from the animals eating the contaminated plants may be contaminated either. Accordingly, it may result in a tremendous harm to the living environment for our next generation and their body health. Furthermore, the high temperature and the noise generated by the exhaust of vehicle (the vehicle with heavy capacity and the vehicle associated with heavy machine are much more serious) may cause defective influence to the sanitation of environment and our body health. In addition, the noise with high decibel makes us irritable, nervous, and uneasy and makes our hearing ability deteriorated. The present invention has been developed and completed by the inventor at last in order to reduce the air being not polluted by the exhaust of a vehicle, and promote the effectiveness of exhaust filtration, noise silence, and temperature reduction. Hence, our living environment and our body health are possible to be least harmed by the exhaust of the vehicle.

SUMMARY OF THE INVENTION

A major object of the present invention is to provide a treatment device for exhaust discharged from a vehicle, which may promote the effectiveness with regard to filtering exhaust, silencing noise, and reducing temperature.

Other objects and features of the present invention will be apparent by way of following description of embodiments with accompanying drawings.

DETAILED DESCRIPTION OF THE PREFERRED EMBODIMENTS

Figure 1:
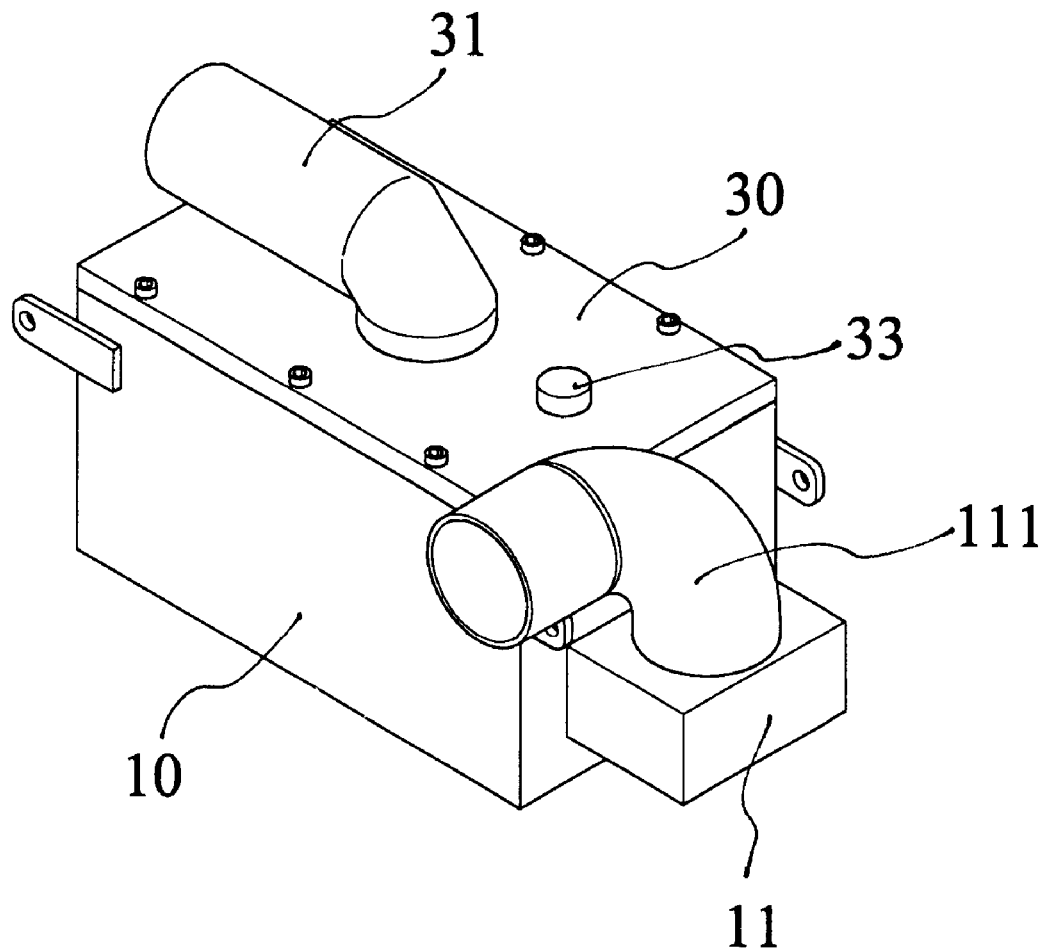
FIG. 1 is a perspective view of a treatment device for exhaust of a vehicle according to the present invention.
Figure 2:
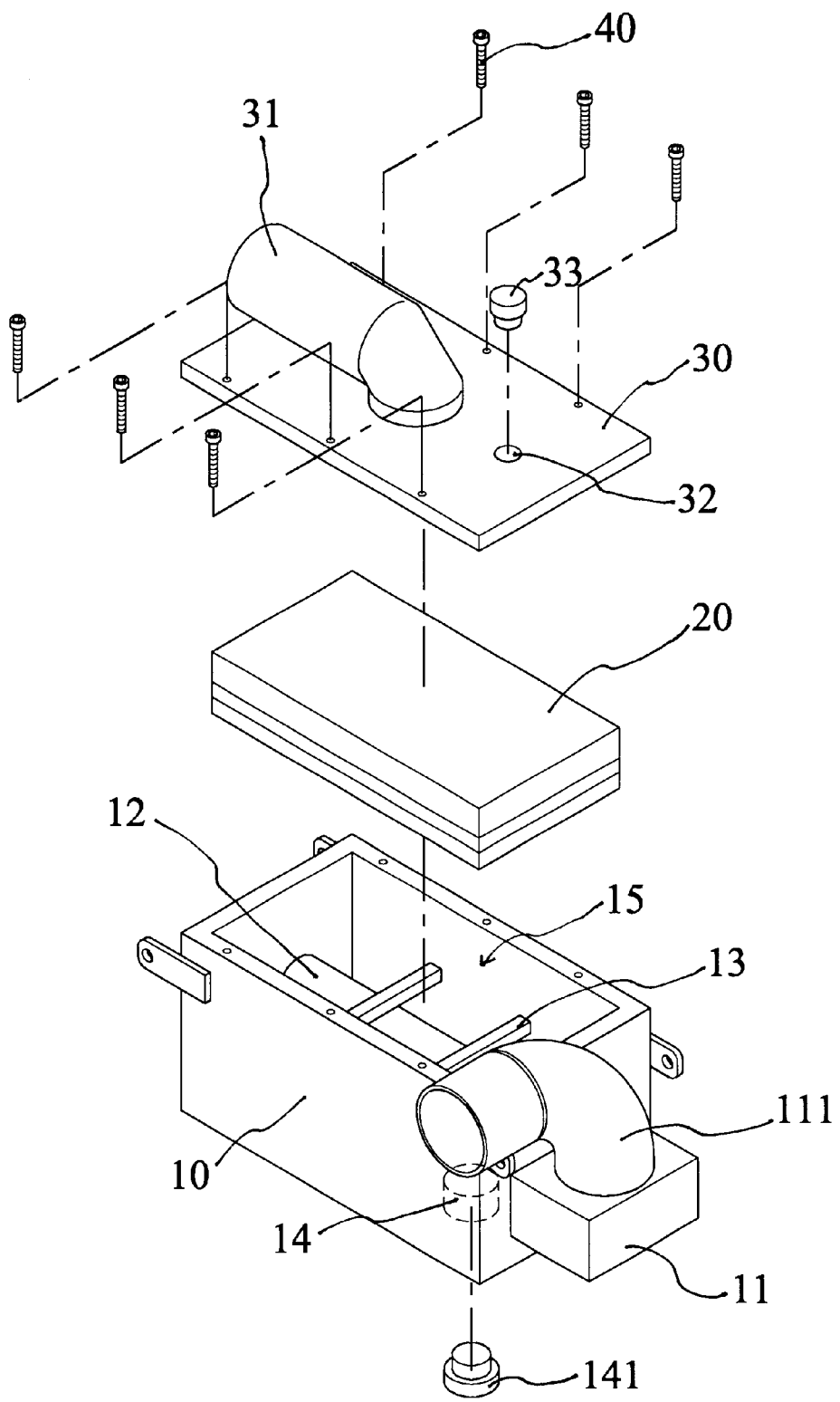
FIG. 2 is an exploded perspective view of the treatment device for exhaust of a vehicle shown in FIG. 1.
Figure 3:
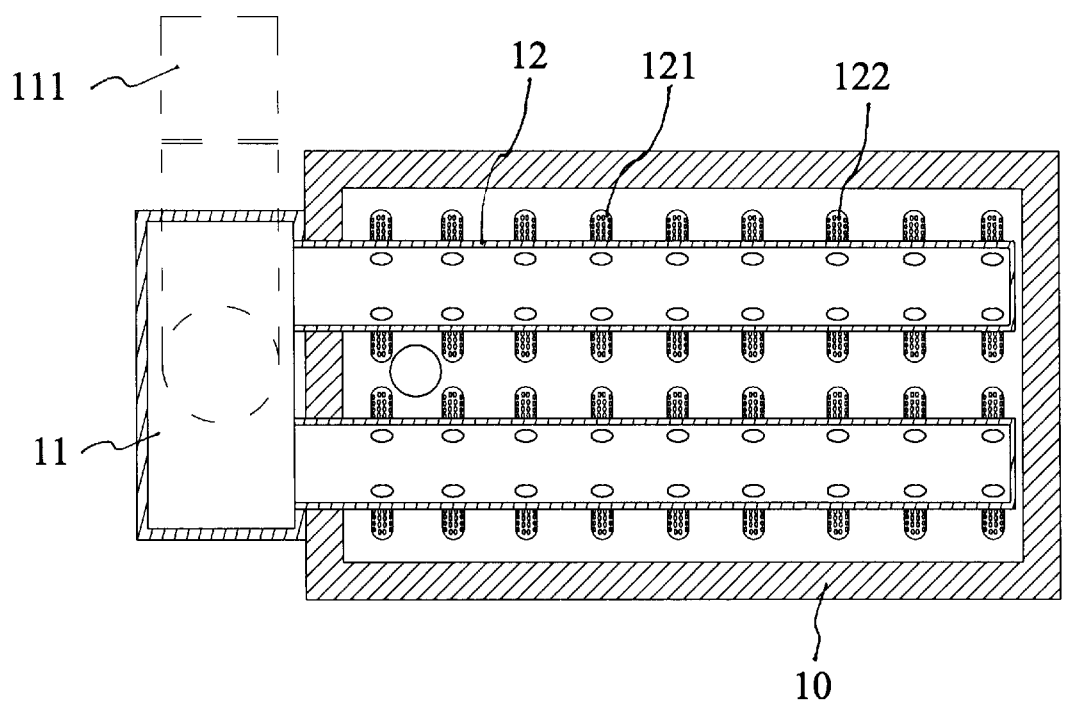
FIG. 3 is a longitudinal sectional view of the treatment device for exhaust of a vehicle shown in FIG. 1.
Figure 4:
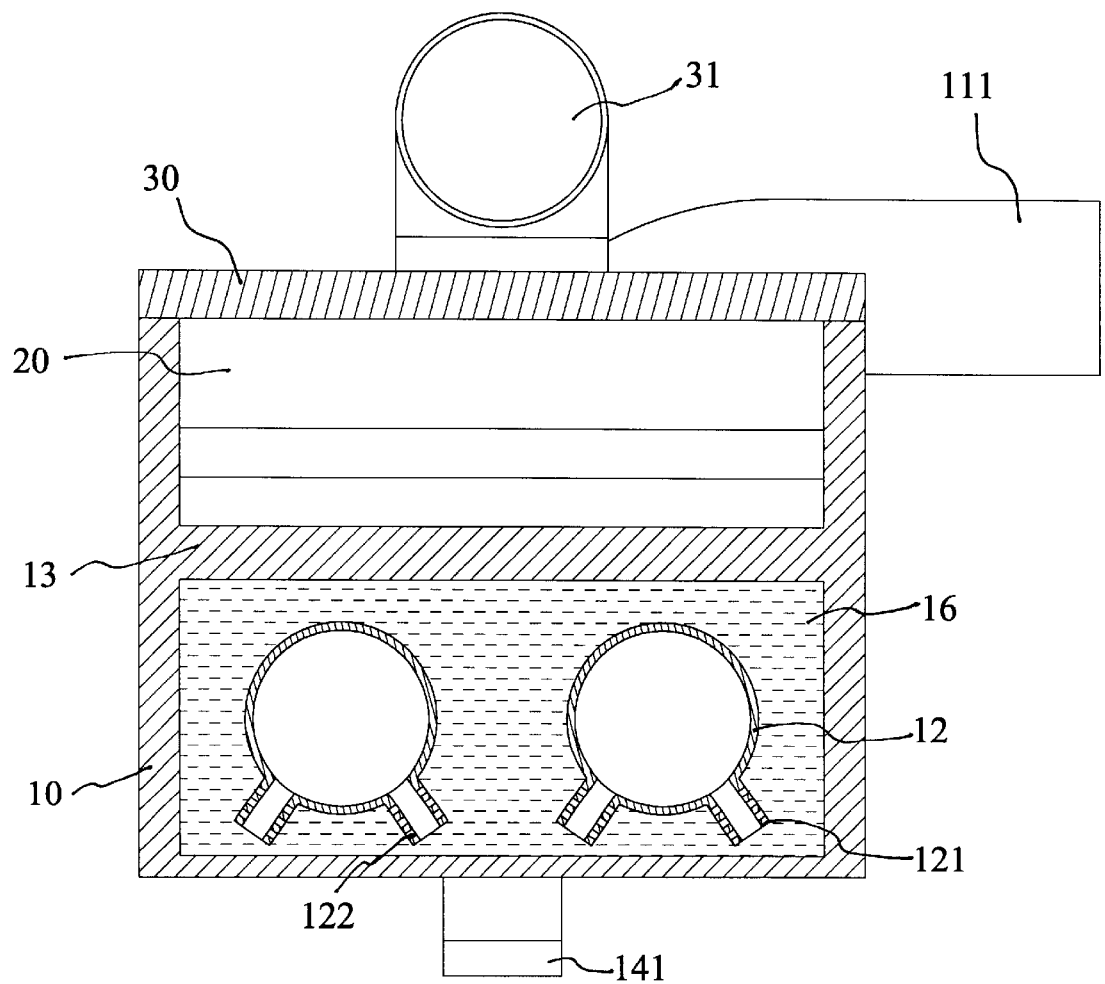
FIG. 4 a transverse sectional view of the treatment device for exhaust of a vehicle shown in FIG. 1.

Referring to FIGS. 1, 2, 3, and 4, a treatment device for exhaust of a vehicle according to the present invention comprises a main body 10, a filter net 20, and a covering lid 30. The main body 10 at the outer side thereof provides an air storage chamber 11 and two branch pipes 12 are mounted in the main body 10 to communicate with the air storage chamber 11. A netting stand 13 is disposed above the branch pipes 12 and the filter net 20 is laid the netting stand 13. A drained hole 14 is provided underneath the main body 10 and blocked by a plug 141. An upper opening 15 is on the main body 10 and is enclosed by the covering lid 30 by way of bolts 40. An inlet pipe 111 is provided on the air storage chamber 11 so as to admit the exhaust of a vehicle. Each of the branch pipes 12 has a plurality of radial tubes 121 and a plurality of air apertures 122 are provided on the wall of each radial tubes 121. The main body 10 is filled in the liquid agent 16 at a level below the netting stand 13. The covering lid 30 provides an outlet pipe 31 communicating with the main body 10 thereon into the air and a filling hole 32 for adding the liquid agent 16 into the main body 10. A sealing plug 33 blocks the filling hole 32.

The exhaust of a vehicle is guided into the air storage chamber 11 from the inlet pipe 111 and passes through the branch pipes 12 to reach radial tubes 121. Then, the exhaust enters the liquid agent 16 as soon as it moves out of air apertures 122 on the radial tubes 121. Finally, the exhaust moves along the outlet pipe 31 on the covering lid 30 via the filter net 20. The exhaust of a vehicle is treated by that the harmful ingredients in the exhaust are solved and attracted in the liquid agent 16. Further, the filter net 20 removes harmful substances such as the poisonous compound, contaminated particles and black smokes so as to reduce the hurt resulting from the exhaust to the human body effectively. The air storage chamber 11 is provided to defer the flow rate of the exhaust so that the exhaust can be sprayed into the liquid agent 16 evenly through air apertures 122 while it flows along the branch pipes 12 and the radial tubes 121. The air apertures 122 are so arranged that the exhaust of a vehicle is possible to become a lot of bubbles with a greater area for contacting the liquid agent 16 evenly during being sprayed into the liquid agent 16. Thus, the liquid agent 16 can solve and attract the harmful substances in the exhaust effectively. In the mean time, the temperature of exhaust and the sound volume of generated noise can also be lowered down effectively. Because the exhaust is evenly sprayed into the liquid agent 16 with a greater area, the little bubbles caused by the widely and evenly spread exhaust may rise straight upward to pass through the filter net 20 with a mode of greater area and more evenness. Thus, the filter net 20 may have a greater contact area with the little bubbles to enhance the effect of filtering and removing the harmful substances in the exhaust greatly. It is noted that a preferable filtration effect may be obtained while the air apertures 122 on the radial tubes 121 are arranged to provide a gross area of all air apertures 122 greater than the opening area of the inlet pipe 111.

It is appreciated from the preceding description that the air storage chamber provided in the present invention is possible to defer the flow rate of exhaust from a car in the process of filtering. In addition, a number of air apertures provided on walls of radial tubes may cause the exhaust to increase contact area with the liquid agent and the filter net respectively for effectively removing harmful substances in the exhaust. Also, the temperature of exhaust and the sound volume of generated noise can be lowered down tremendously.

While the invention has been described with reference to preferred embodiments thereof, it is to be understood that modifications or variations may be easily made without departing from the spirit of this invention, which is defined by the appended claims.

What is claimed is:

1. A treatment device for the exhaust of a vehicle comprising:
   a) a main body having an interior with an upper opening and at least one lateral side;
   b) an exhaust storage chamber on the at least one lateral side;
   c) an exhaust inlet pipe in communication with an exhaust storage chamber to direct exhaust from the vehicle into the exhaust storage chamber, the exhaust inlet pipe having an opening;
   d) a liquid agent in the interior of the main body having a predetermined depth;
   e) a filter net located in the interior of the main body above an upper level of the liquid agent;
   f) a covering lid attached to the main body so as to cover the upper opening, the covering lid having an outlet pipe in communication with the interior of the main body;
   g) at least one branch pipe in the interior of the main body immersed in the liquid agent, the at least one branch pipe in communication with the exhaust storage chamber so as to receive exhaust of the vehicle therefrom; and,
   h) a plurality of tubes in communication with and extending radially from the at least one branch pipe, each tube having a plurality of apertures through a side wall thereof, wherein a total area of all the apertures is greater than an area of the opening of the inlet pipe.

2. The treatment device for an exhaust of a vehicle according to claim 1 comprising two branch pipes extending parallel to each other and being immersed in the liquid agent, each branch pipe having a plurality of tubes extending radially therefrom.

* * * * *